US006389327B1

(12) United States Patent
Thiel

(10) Patent No.: US 6,389,327 B1
(45) Date of Patent: May 14, 2002

(54) MAIL PROCESSING SYSTEM WITH A FRANKING AND ADDRESSING MACHINE AND METHOD FOR COMBINED FRANKING AND ADDRESS PRINTING

(75) Inventor: Wolfgang Thiel, Berlin (DE)

(73) Assignee: Francotyp-Postalia AG & Co., Birkenwerder (DE)

(*) Notice: Subject to any disclaimer, the term of this patent is extended or adjusted under 35 U.S.C. 154(b) by 0 days.

(21) Appl. No.: 09/146,344

(22) Filed: Sep. 2, 1998

(30) Foreign Application Priority Data

Sep. 5, 1997 (DE) ........................................ 197 40 397

(51) Int. Cl.[7] ................................................ G06F 7/00

(52) U.S. Cl. ....................... 700/227; 700/228; 700/229; 700/230; 705/408; 271/2; 271/184; 271/185; 271/186

(58) Field of Search ................................ 700/227, 228, 700/229, 230, 2, 184, 185, 186; 271/2, 184, 185, 186; 705/408

(56) References Cited

U.S. PATENT DOCUMENTS

| | | | | |
|---|---|---|---|---|
| 4,627,097 A | | 12/1986 | Finlay et al. | |
| 4,726,461 A | * | 2/1988 | Pokriinchak | 195/412 |
| 4,800,505 A | | 1/1989 | Axelrod et al. | |
| 4,815,374 A | | 3/1989 | Remy | |
| 4,881,460 A | * | 11/1989 | Bannister et al. | 101/91 |
| 4,911,422 A | * | 3/1990 | Auerbach | 271/225 |
| 4,940,887 A | | 7/1990 | Sheng-Jung | |
| 5,104,470 A | * | 4/1992 | Ritchie | 156/277 |
| 5,126,753 A | | 6/1992 | Martin et al. | |
| 5,154,405 A | * | 10/1992 | Gravesom et al. | 271/2 |
| 5,207,858 A | * | 5/1993 | DeBarber et al. | 156/441.5 |
| 5,444,961 A | | 8/1995 | Doane et al. | |

(List continued on next page.)

FOREIGN PATENT DOCUMENTS

| | | | |
|---|---|---|---|
| DE | 34 12 464 | 10/1985 | |
| DE | 38 21 106 | 5/1989 | |
| DE | 40 37 186 | 4/1991 | |
| DE | 196 05 014 | 1/1996 | |
| DE | 196 05 015 | 1/1996 | |
| DE | 196 45 363 | 10/1996 | |
| EP | 0 054 708 | 6/1982 | |
| EP | 556922 A1 * | 8/1993 | 271/2 |

OTHER PUBLICATIONS

Patent Abstracts of Japan, M–267, Jan. 11, 1984 vol. 8/No., 5 for Japanese Application No. 57–49120.

*Primary Examiner*—Christopher P. Ellis
*Assistant Examiner*—Michael E. Butler
(74) *Attorney, Agent, or Firm*—Schiff Hardin & Waite

(57) ABSTRACT

In a mail processing system with a franking and addressing machine and to a method for combined franking and address printing, both printing jobs for franking or addressing are sequentially implemented in a specific sequence in separate passes with a single print head. The print medium surface is correspondingly printed while the print medium is transported past the print head. A turning station is provided for rotating a print medium by approximately 180° before or after the printing and is arranged in the mail processing system preceding or following the digital printer device. A control unit of the digital printer device controls the turning station via an interface such that the print media are applied to the digital printer device rotated in a predetermined way, and switches the printer device between the corresponding modes for the respective printing jobs, with a modified print control ensuing for at least one printing job and the control unit causing rotation of the print format by 180° for the printing. After a first pass of the letter through the printer device for printing the first print format, the letter, rotated by 180° in the plane of its flat sides, is reapplied to the printer device so that the same print head prints the second print format rotated by 180° relative to the first print format, given corresponding control of the print signals. The renewed application can ensue to the right or left of the printer device.

23 Claims, 7 Drawing Sheets

U.S. PATENT DOCUMENTS

| | | | | | |
|---|---|---|---|---|---|
| 5,467,709 | A | | 11/1995 | Salomon | |
| 5,544,874 | A | * | 8/1996 | DeFigueredo | 271/2 |
| 5,600,562 | A | * | 2/1997 | Guenther et al. | 364/464.11 |
| 5,608,636 | A | * | 3/1997 | Guenther | 364/464.18 |
| 5,781,934 | A | * | 7/1998 | Cordery et al. | 380/25 |
| 5,790,768 | A | | 8/1998 | Windel et al. | |
| 5,971,161 | A | * | 10/1999 | Branecky et al. | 209/657 |
| 5,991,409 | A | * | 11/1999 | Windel et al. | 380/23 |
| 6,041,704 | A | * | 3/2000 | Pauschinger | 101/91 |
| 6,045,278 | A | * | 4/2000 | Kubatzki et al. | 400/635 |
| 6,179,288 | B1 | * | 1/2001 | Bexelga et al. | 271/225 |
| 6,247,774 | B1 | * | 6/2001 | Mueller | 347/2 |

* cited by examiner

MAIL PROCESSING SYSTEM WITH A FRANKING AND ADDRESSING MACHINE AND METHOD FOR COMBINED FRANKING AND ADDRESS PRINTING

BACKGROUND OF THE INVENTION

1. Field of the Invention

As used herein, the terms letter, piece of mail or print medium include all types of envelopes or other print recording media. Postal matter, file cards, labels or self-adhesive tapes of paper or similar material can be employed as recording media.

2. Description of the Prior Art

For moderate to high volume of letters or other mailings to be sent, postage meter machines are used in a standard way for franking the mailings. Differing from other printers, a postage meter machine is suitable for processing filled envelopes, potentially even having very different formats.

Modern postage meter machines use digital printer units. For example, the postage meter machine T1000 commercially available from Francotyp-Postalia AG & CO. has a thermal printing unit. With this, it is fundamentally possible to print arbitrary texts and special characters, possibly rotated as well, but only in the franking stamp print area. German OS 42 24 955 discloses circuitry for a switching the postage meter machine to internal cost center printing, with the same print head being utilized for this printing job as for the printing job of franking. This postage meter machine, however, is not able to print an address information.

The postal regulations of most countries also preclude the address information from ensuing at the same level as the franking imprint. Since postage meter machines are not fashioned for printing in the address area of the envelope, an auxiliary means must be utilized for the address printing. This can ensue with standard printer units that are either built into an office printer (for example laser printers) or in specific addressing machines that, for example, print an address label with a thermal printer unit. Such standard printer units, however, are either too slow or do not allow the processing of filled envelopes differing in size (mixed mail). The address imprints are usually applied onto the unfilled envelope by separate, fast addressing machines. Numerous letters, particularly business mail, are mailed with window envelopes, whereby the address is already printed on the letter and is visible through an envelope window. This type of letter, however, makes an impersonal impression and is considered unsuitable for advertizing purposes (direct marketing) (see German OS 38 08 178). Consequently, the use of separate, specific addressing machines for filled envelopes is nonetheless desired.

Apart from the problems of developing matched machines for a system processing mixed mail, the employment of two separately working machines in a system for mail processing represents a considerable investment. In addition to the floor or counter space required for two machines, there is also a doubled maintenance outlay. That increases the costs of such systems.

In general, a mail processing system is composed of a number of different devices, for example an automatic feeder station, a dynamic scale, a postage meter machine and a letter deposit. The devices are either centrally controlled or enter into communication with one another. Some mail processing machines are also composed of stations having their own intelligence. The base station of the system is a postage meter machine, for example a JetMail® unit commercially available from Francotyp-Postalia AG & Co., that can also be controlled by a personal computer, as disclosed in detail, for example, in German Application 197 11 998.0. The processing of filled letters of different thickness and different formats given medium through high shipping volumes can ensue with this unit.

In an embodiment of the JetMail® printer device has for use given a non-horizontal, approximately vertical letter transport, a franking and address printing are enabled with a common ink jet print head which is adjustable in position behind a guide plate between two recesses or with two separate ink jet print heads (German PS 196 05 014 and German PS 196 05 015). The mechanism for the version with a common, adjustable ink jet print head would have to be driven such that the letter transport is interrupted and an adjustment into a second position ensues after the printing of the first print format has been ended. The printing could then be continued. In this second position, however, an ink jet print head cannot be sealed by a corresponding clearing and sealing station. It would first have to be moved back in the Y-direction into the first position.

This second position does not allow the printing of a long second print format for the address when the first print format to be printed during letter movement in the transport direction (X-direction) already has a long length, i.e. it includes, for example, a franking stamp, municipality name/date stamp and an advertizing slogan and a further field for a shipping information or personal message. The width of the second print format lying orthogonal to the transport direction, i.e. in the Y-direction, is limited. The remaining space may not be enough for the second print format. If the length for the second print format could be longer, this would appear as an overlap from a vertical point of view, i.e. opposite the Y-direction. Such a vertical overlap, however, can be generated with two ink jet print heads since the printing of the second print format would have to begin before the printing of the first print format has been ended.

For this other version with two ink jet print heads, however, two cleaning and sealing stations and corresponding actuators, sensors, control and ink delivery means would also be required to be doubly implemented. It is currently still difficult to economically manufacture reliable ink jet print heads with large printing width and high resolution. An economical postage meter machine cannot be manufactured embodying such a redundancy of components.

SUMMARY OF THE INVENTION

An object of the invention is to create an economic mail processing system with a machine that is flexibly designed for various printing jobs. The system should enable the printing of print imprint formats that overlap from a vertical point of view.

Another object of is to provide an arrangement for a printer device and a method for printing on a print medium by non-contacting printing with an ink print head that allow at least the printing of two print imprint formats at a distance from one another with only a single stationary print head that has a standardized printing width, without additional moving machine elements being required in the printer device. The machine should be able to frank and address outgoing mail. The mechanism should nonetheless be as simple as possible.

These objects are achieved in accordance with the invention in a mail processing system having a printer device and a turning station with which a print medium can be rotated by approximately 180° before or after printing, the turning station being arranged in the mail processing system preceding or following the printer device. These objects are also achieved in a method for operating such a mail processing system. Both printing jobs for the above functions of franking or addressing are inventively sequentially implemented. Only a single printer device suitable for a digital printing is thereby employed, this being controlled by a control unit that also controls the turning station via an interface such that the print media are applied to the digital printer device rotated in a predetermined way. The print media are preferably letters, particularly filled envelopes with different size and weight (mixed mail). At least two passes of the same envelope through the printer device thereby ensue for the implementation of two different printing jobs with one and the same printer device, with the envelope for at least one printing job being rotated by 180° in the plane of its flat sides.

The control unit connected to the turning station by interfaces controls the turning station such that the envelopes are applied to the digital printer device rotated in a predetermined way. Sensors that are connected to the control unit are arranged at that side of the franking and addressing machine at which the envelopes (print media) are applied. The control unit is programmed to switch the printer device between the corresponding modes for the respective printing job, with a correspondingly modified print control being provided for the at least one printing job. The control unit of the printer device may control further stations of the mail processing system via a further interface. The control unit is capable of generating one of the address or franking print formats and for implementing a pass for a corresponding printing, so that the printer means is charged with a print format turned by 180° compared to the other print format. By using electronic sensors and electronic control procedures, the invention advantageously avoids a necessity for any significant mechanical modifications with respect to the guide plate for two printer heads, or a need for additional moving machine elements in the printer for the common print head.

After the first pass of the letter through the printer device for printing the first print format, the letter, rotated by 180° in the plane of its flat sides by a turning station, is applied to the printer device so that, given corresponding control of the print signals, the same print head prints the second print format rotated by 180° relative to the first print format. The renewed application to the printer device can occur in two method versions:

1st version: After rotation, the letter is applied to the side (called right side below) of the machine that it exited in the first pass.

2nd version: After rotation, the letter is applied to the same side (left side) as in the first pass.

The system with the inventive arrangement composed at least of the aforementioned two stations is correspondingly switchable. It can be individually operated either as a franking system or as an addressing system, or as a combination of franking and addressing systems. One or more passes without a printing can be made in addition to the passes with a printing corresponding to a respective printing job. This makes it possible to insert the envelope or to exit the printer device at another of the two possible sides as needed.

Advantageously, the arrangement requires neither a further ink jet print head in the printer device of the postage meter machine base station nor a further printing station for handling an additional printing job. The printer device is provided, in particular, for printing letters and is thus a component of a combined franking/addressing machine that represents the base station of the overall system. In a standard way, the letter transport mechanism of the printer device proceeds downstream and is mechanically fashioned such that the letter transport direction can be easily reversed. After a directional reverse of the transport direction, the letter is transported upstream.

Further, known stations can be arranged in the mail processing system in addition to the inventive letter turning station. In an alternative to the first version, a return of the mail stream to the entry location ensues outside of the printer device rather than within the printer device. A turning station can be arranged in the return loop at an arbitrarily selectable location, or can be integrated into a suitable station. The construction of the mail processing system of suitable stations and a turning station advantageously enable an economic adaptation of the systems to different customer requirements.

DESCRIPTION OF THE PREFERRED EMBODIMENTS

Figure 1A:
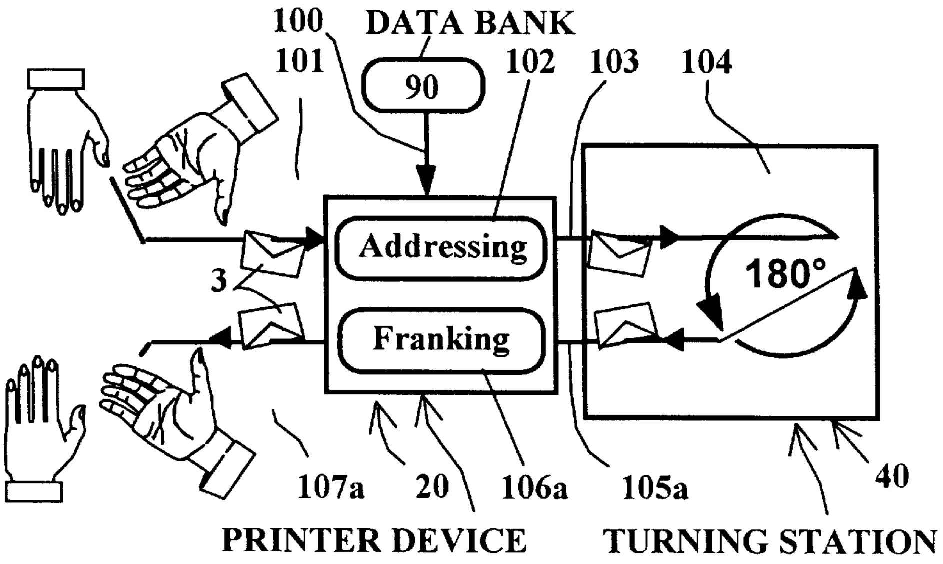
FIG. 1*a* is a schematic block diagram of a first embodiment of a mail processing system constructed in accordance with the principles of the present invention, showing a first method for using the system.

As shown in the various figures, the inventive method allows printing each of two different print formats, with a separate pass of the print medium 3 ensuing through the same printer unit 20 of a franking and addressing machine FAM (see FIGS. 5*a*, 5*b*), with the print medium being re-inserted to the same printer device 20 for the further pass. The respective motion phases and orientation of the print medium are identified by sensors and a corresponding modem switching is undertaken: The print control signals for a print format that is rotated by 180° compared to the print format of the other pass are generated for one of the two passes given insertion of a rotated print medium. The print control signals of the print formats of both passes are supplied to a single print head 4 of the digital printer device 20 during printing.

The letter turning station generally has the function of rotating the letter by 180° in the plane of its flat sides in order to enable a renewed intake of the letter by the printer device 20. Two basic arrangements are described according to a first version and a second version of the arrangement, each with two operating modes (a) and (b):

In a first version of the arrangement, the turning station 40 lies downstream of the printer unit 20. The function of this first version of the arrangement is explained with reference to FIGS. 1*a* and 1*b*. For the first pass, the letter surface is placed against a guide plate that contains a recess for the print head. The letter is rotated by 180° in the plane of its flat sides and is then turned over such that it stands on edge. After completion of the first letter pass, the letter is supplied from the printer device 20 to the letter turning box (letter turning box 41 of FIGS. 3*a*, 3*b* and 3*c*) of the turning station 40, is rotated and is drawn in again by the printer device 20 for the second pass. Viewed functionally, the letter turning box is thus arranged following the printer device 20. After the second pass, the letter finally leaves the printer device 20. Two versions according to FIG. 1*a* or 1*b* arise dependent on the side at which it leaves the machine.

For an inventive, first arrangement with turning station 40 following the printer device 20, FIG. 1*a* shows the following method sequence:

Step 100, input of the address into a control unit 1 (see FIG. 4*b*) of the printer device 20;

Step 101, delivery of a letter 3 belonging to the address to an initial transport position, whereby the letter 3 is rotated by 180° in the plane of its flat sides and, turned over standing on edge, is applied to a guide plate or placement point at the left side of the printer device;

Step 102, generating the print format for the address in the control unit 1 and implementation of a first pass with address printing, whereby a print head 4 of the printer device 20 is charged with a print format rotated by 180°, so that the address is printed column-by-column from right to left on the letter surface, and the letter transport ensues downstream in the transport direction to the turning station 40;

Step 103, delivering the letter 3 to the turning station 40;

Step 104, rotating the letter 3 in the turning station 40, whereby the letter is rotated by 180° in the plane of its flat sides;

Step 105*a*, delivering the letter 3 for the renewed application to the printer device;

Step 106*a*, switching the printer device 20 to franking mode, with the transport direction through the printer device 20 being reversed in order to transport the letter 3 back to the initial transport location, and whereby the imprint onto the letter surface in the second pass by the printer device 20 ensues with a non-rotated print format, column-by-column from left to right;

Step 107*a*, removal of the addressed and franked letter 3 from the printer device 20 at the aforementioned placement point.

For the entry of the address into the control unit 1 of the printer device 20, the step 100 preferably includes a sub-step for the delivery of an address from a data bank 90 of a personal computer to the control unit 1. As used herein the term address means a complete information set with respect to name and residence of the letter recipient. Alternatively, the address input can ensue manually by keyboard of a personal computer or by keyboard of the printer device 20 and may be merely rechecked by the personal computer for correctness of the information.

It is assumed in the version according to FIG. 1*a* that the letter is applied to the left input side of the machine rotated by 180° and turned over (flap side up), so that the letter surface can be printed column-by-column in the standard printing direction (from right to left) by the print head of the printer device 20 in the first pass. Correspondingly, a print format rotated by 180° is also printed in the first pass. The letter is then rotated in the following letter turning station. In the second pass, the franking and addressing machine in fact prints the letter surface with a non-rotated print format but column-by-column from left to right, i.e. in an unusual way for postage meter machines for printing a franking imprint. The letter is removed at the placement point, i.e. the left input side of the printer device 20, and does not proceed into the letter turning station 40 again.

It is advantageous given this version according to FIG. 1*a* that the letter turning station 40 always executes the same work sequence and, further, that no possibility is provided for removing the letter from the system at the right. The letter is subjected only to two passes and one rotating. The overall throughput time is thus the shortest of all versions.

Figure 1B:
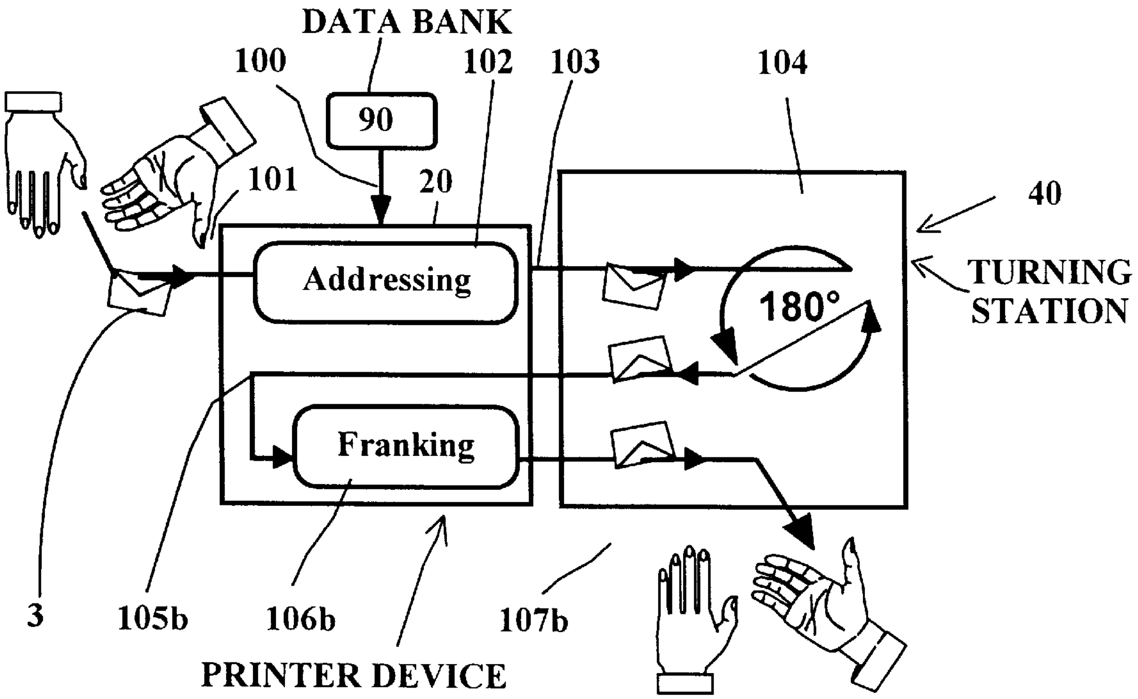
FIG. 1*b* is a schematic block diagram of a further version of the first embodiment of the mail processing system constructed in accordance with the invention, illustrating a second wave using the system.

FIG. 1*b* shows the first arrangement with turning a station 40 following the printer device 20, operated in a modified method sequence:

Step 100, input of the address into the control unit 1 of the printer device 20;

Step 101, delivery of an letter 3 belonging to the address to an initial transport position, whereby the letter 3 is rotated by 180° in the plane of its flat sides and, turned over standing on edge, is applied to a guide plate or a placement point at the left side of the printer device unit 20;

Step 102, generating the print format for the address in the control unit 1 and implementation of a first pass with address printing, whereby the print head 4 of the printer device 20 is charged with a print format rotated by 180°, so that the address is printed column-by-column from right to left on the letter surface, and whereby the letter transport ensues downstream in transport direction to the turning station 40;

Step 103, delivering the letter 3 to the turning station 40;

Step 104, rotating the letter 3 in the turning station 40, whereby the letter 3 is rotated by 180° in the plane of its flat sides;

Step 105*b*, delivering the letter 3 for renewed application to the printer device 20 and switching the transport direction to "return transport," whereby the letter 3, after it has again been drawn in by the printer device 20 from the letter turning station 40, is transported back into the aforementioned initial transport position in a second pass without any printing;

Step 106*b*, switching the printer device 20 to franking mode, with the letter 3 being transported through the printer device 20 in a third pass in the same direction as the first letter pass and is printed with a non-rotated print format, column-by-column from right to left;

Step 107*b*, removal of the addressed and franked letter 3 from the turning station 40 at an output point.

It should be noted that, in this version of the method shown in FIG. 1*b*, the letter 3, after it has again been drawn in by the printer device 20 from the letter turning station, is transported back into the initial printing position in a second pass without being printed. Simultaneously, the turning box of the turning station 40 re-assumes its initial position. The transport direction of the letter is again switched for the third pass. The letter 3 is now transported in the same direction as in the first letter pass and is printed with an non-rotated print format and column-by-column from right to left, i.e. in the standard way for printing franking stamps in postage meter machines. After the end of the third pass, it proceeds again into the letter turning station 40 that, however, does not return it to the franking and addressing machine FAM this time. This is achieved in the simplest fashion by, following the third letter pass, a sensor 50 detecting the letter 3 in the turning box, causing the letter transport mechanism of the printer device remain shut off until the letter 3 is removed from the letter turning box. Whether the letter is rotated again is of no consequence. It is advantageous given this version that the sequence of print control signals during franking need not be modified and a synchronization of the print control signals with the letter transport needs to be assured for only one transport direction. The letter 3 is subjected to three passes and one rotation. The overall throughput time is thus somewhat longer compared to the first embodiment version. The length of the overall throughout time plays no significant part given a low mail volume wherein the letters to be franked and addresses are already individually applied.

Figure 2A:
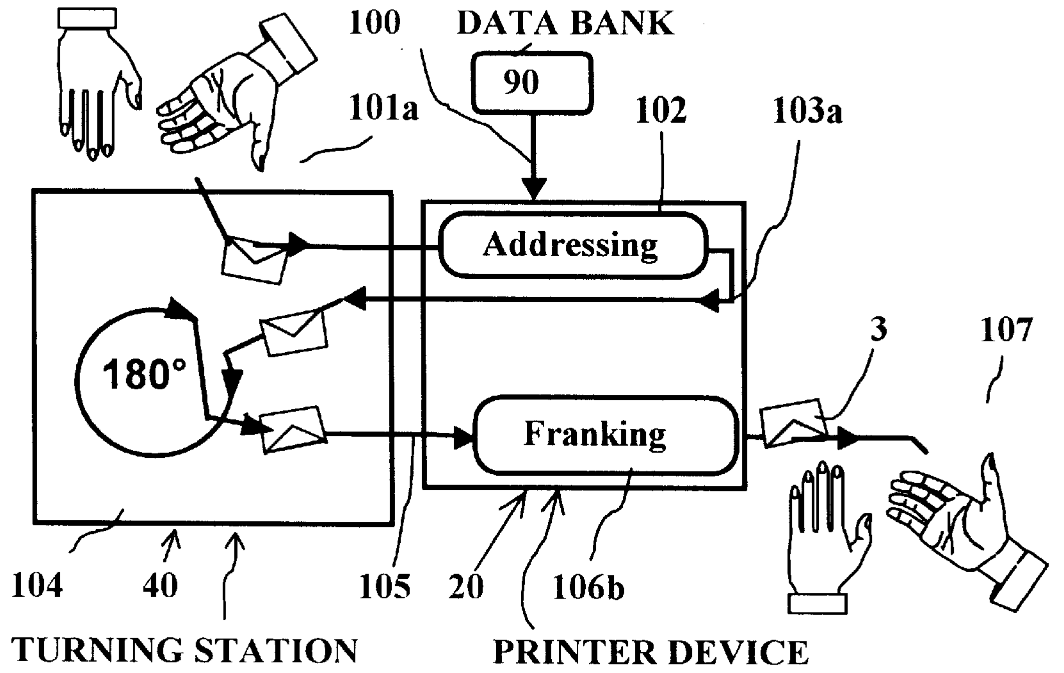
FIG. 2*a* is a schematic block diagram of a second embodiment of a mail processing system constructed in accordance with the principles of the present invention, showing a first method for using the system.
Figure 2B:
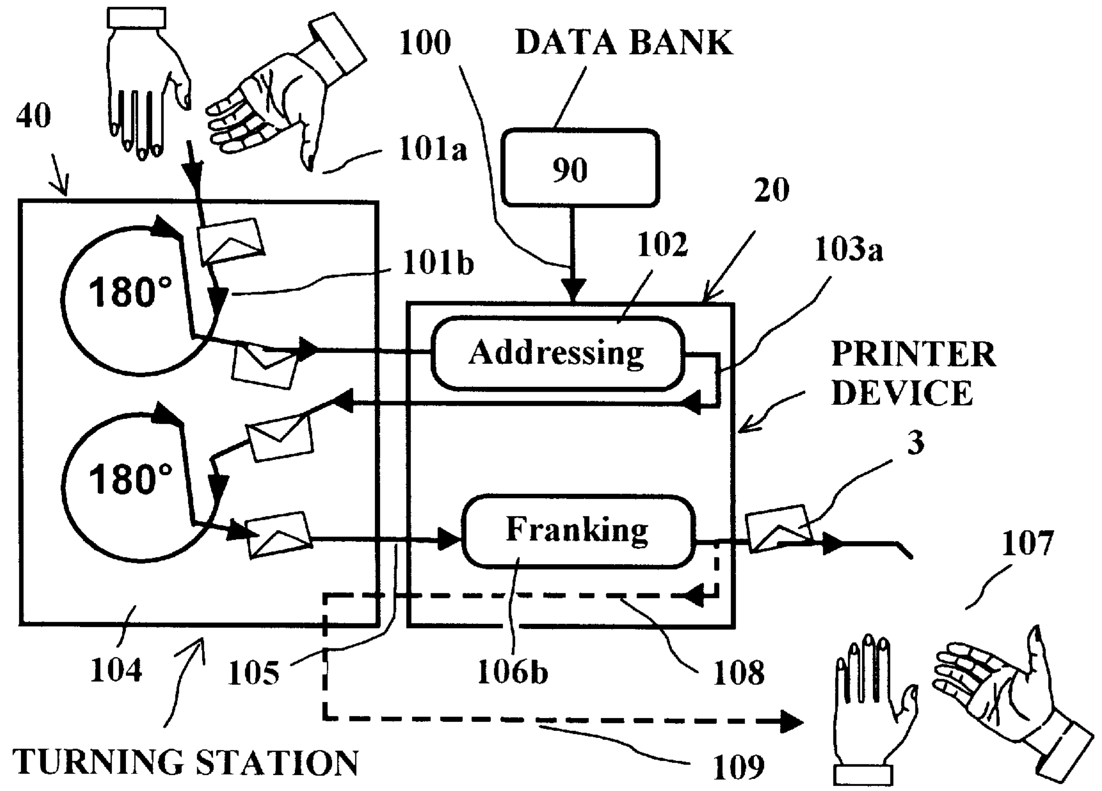
FIG. 2*b* is a schematic block diagram of a further version of the second embodiment of the mail processing system constructed in accordance with the invention, illustrating a second wave using the system.

FIGS. 2*a* and 2*b* illustrates an inventive, second arrangement with the turning station preceding the printer device 20. The letter turning station 40 is located preceding the printing device 20, i.e. at the input side. The letter 3 is again rotated by 180° in the plane of its flat sides and is applied to the guide plate turned over with its edge standing on the lower seating surface 413 (See FIG. 3*a*) of the letter turning box 41, with its surface to be printed facing against the back wall 412 of the letter turning box 41. The letter turning mechanism is rotated by a motor and, after overcoming static friction, the letter 3 slides on the lower seating surface 413 to the initial transport position relative to the printer device 20. There is also a version wherein the letter 3 is only turned over but not rotated, with its surface to be printed placed against the back wall 412 of the letter turning mechanism. The letter turning box 41 then implements the required rotation before the letter is drawn in by the printer device 20 for the first pass for printing the address. The drive of the print head 4 in the first pass again ensues with a print format turned by 180° in a departure from the usual operation of a postage meter machine, i.e. in the same way that was already described in the previous versions. After the conclusion of the first pass, the transport direction is reversed and a second pass ensues without printing. The letter 3 is again output to the letter turning station 40, rotated and again drawn in by the printer device 20 for the third pass for printing the franking imprint. In the first and third letter passes, thus, the transport direction during printing can be the same as in the second exemplary embodiment according to the version of FIG. 1*b*.

The second arrangement with a turning station 40 preceding the printer device 20 operates according to the following method sequence illustrated in FIG. 2:

Step 100, input of the address into the control unit 1 of the printer device 20;

Step 101, delivery of a letter 3 belonging to the address to turning station 40 preceding the printer device 20, whereby the letter 3 is rotated by 180° in the plane of its flat sides and, turned over standing on edge, is applied to a placement point and is supplied to an initial transport position of the printer device 20;

Step 102, generating the print format for the address in the control unit 1 and implementation of a first pass with address printing, whereby a print head 4 of the printer device 20 is charged with a print format rotated by 180°, so that the address is printed column-by-column from right to left on the letter surface, and the letter transport ensues downstream in the transport direction;

Step 103*a*, stopping the transport in transport direction in the printer device 20 and switching the printer device 20 to "return transport," whereby the letter 3 is transported back into the aforementioned turning station 40 in a second pass without printing;

Step 104, rotating the letter 3 in the turning station 40, so that the letter 3 is rotated by 180° in the plane of its flat sides;

Step 105, delivery of the letter 3 for renewed application to the printer device 20;

Step 106*b*, switching the franking and addressing machine FAM to franking, whereby the letter 3 is transported through the printer unit 20 in a third pass in the same direction as the first letter pass and is printed with a non-rotated print format and column-by-column from right to left in a known way;

Step 107, removal of the addressed and franked letter 3 from an output point of the printer device 20.

In this version of the method according to FIG. 2*a*, the transport direction of the letter 3 is reversed after the conclusion of the first pass. A second pass begins without printing being implemented. After the end of the second pass, the letter 3 ends up in the turning box 41 and is rotated by 180°. For a third pass, the transport direction is reversed again and the letter 3 is franked in the usual way. After the conclusion of the third pass, the letter 3 is output at the opposite side of the printer device 20 and does not proceed into the letter turning box 41 again. The letter 3 is subjected to three passes and one rotation.

In an optional, further step 101*b* after the step 101*a* a rotation of the letter 3 can always be made in the turning station 40 before delivery to the printer device 20. This allows employment of an automatic feeder in order to always supply the letter 3 aligned in the same way regardless of the printing job. Such a method version is shown in FIG. 2*b*. The remaining steps 102 through 107 are implemented in a manner analogous to the version already explained according to FIG. 2*a*.

In a further method version in step 108 a fourth pass without printing and a step 109 for the removal are undertaken instead of the step 107. Otherwise, the execution proceeds as explained above. At the end of the method, the letter 3 is merely supplied to the turning station 40 again before removal. To that end, the transport direction of the letter 3 is switched again. For illustrating this version, steps 108 and 109 are shown with broken lines in FIG. 2*b*. The removal of the letter 3 then ensues from the turning station 40 to the left of the printer device 20.

Given the aforementioned versions according to FIG. 2*b*, a rotation of the letter 3 by the letter turning station 40 ensues at the start. Only a turned-over but non-rotated letter 3 thus has to be supplied to the letter turning station 40 before the first pass. The delivery thus ensues in a way that is the same for all printing jobs and can be implemented by an automatic feeder station within a mail processing system. Advantageously, the letter 3 turning station 40 can be integrated in the automatic feeder station. The letter is then subjected to two rotations in the letter turning station 40 and is again subjected to the aforementioned three passes through the printer device 20, with printing taking place only in the first and third passes.

Two advantages arise for the last-described method version( with steps 108 and 109). As in the initially-described version, the delivery and the removal of the letter 3 occur at the same side of the printer device 20, which allows this machine to be placed with its back directly against a wall of a room or against some other device. As in the second method version shown in FIG. 1*b*, the transport direction when printing can be the same in both letter passes, however, an additional motion phase for the letter 3 occurs due to the fourth pass.

Although a different sequence of the print control signals is required in the two letter passes in the first method version shown in FIG. 1*a* and the transport direction when printing is opposite, the overall throughput time of the sum of individual passes is minimal.

Figure 5A:
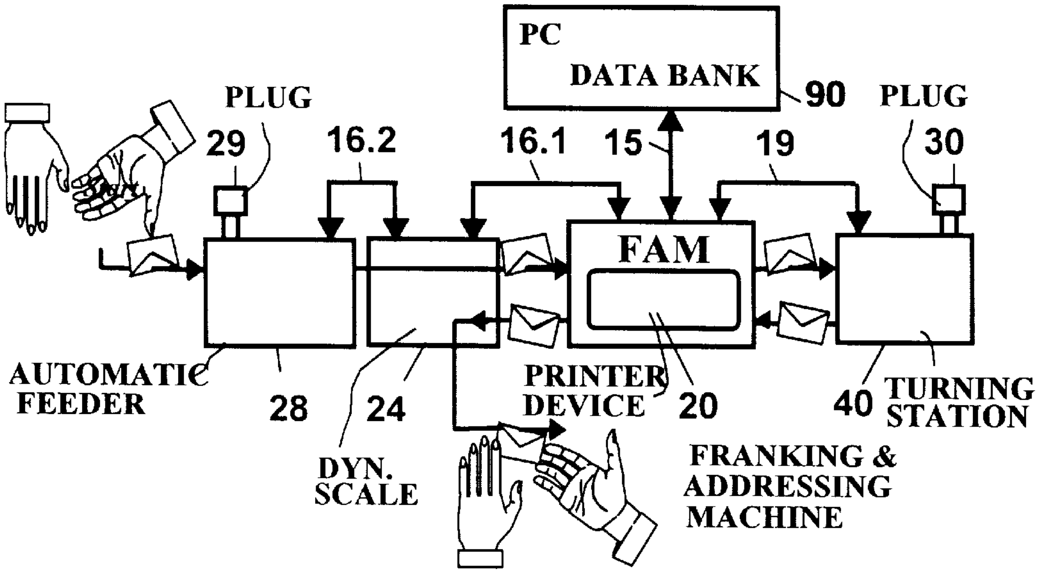
FIG. 5*a* is a schematic block diagram illustrating a mail processing system constructed and operating in accordance with the invention for transporting a letter both downstream and upstream.
Figure 5B:
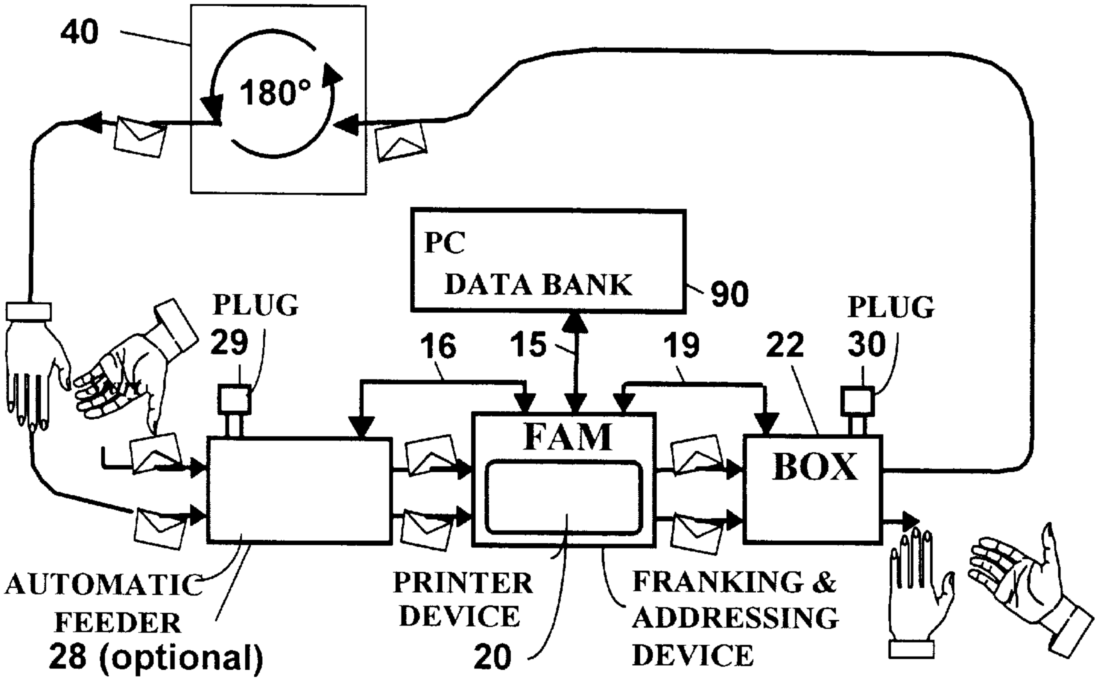
FIG. 5*b* is a schematic block diagram of another version of the mail processing system in accordance with the invention for transporting a letter only upstream.

Dependent on the specific application, different priorities may exist among space requirements, costs for the retrofitting an existing system, overall throughput time, printing quality, etc., a suitable version of the inventive method can be employed. Further versions are shown in FIGS. 5*a* and 5*b*.

Figure 3A:
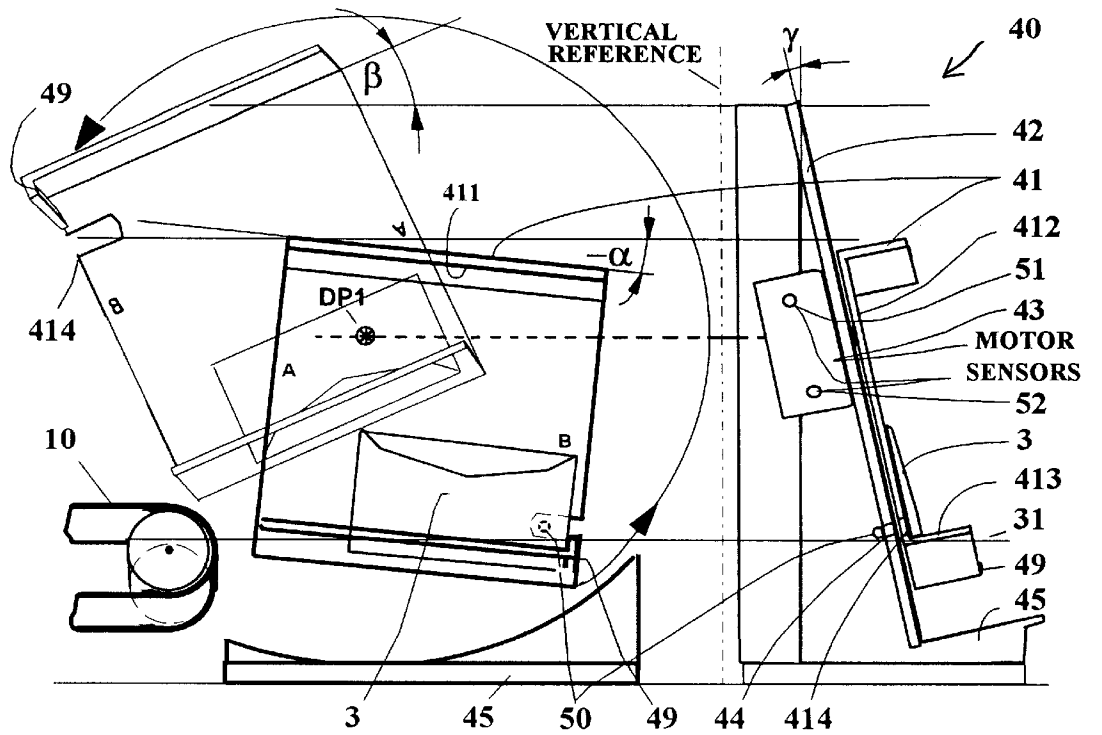
FIG. 3*a* shows an "unfolded" front and side view of the first embodiment of the mail processing system in accordance with the invention.

The inventive letter turning station 40 is described in greater detail on the basis of the first version in the system following the printer device 20. FIG. 3*a* shows a front view (left) and a side view (right) "unfolded" around a vertical axis. For simplification, only the conveyor belt 10 of the printer unit 20 fashioned for approximately vertical letter transport is shown, the letter proceeding to the turning station 40 thereon. The letter 3 thereby stands on the placement edge 31 and is transported in the letter transport direction (X-direction) and then slides into a letter turning box 41 fashioned for letter acceptance. In this preferred version of approximately vertical letter transport, the letter turning station 40 is composed of a letter turning box 41 that is rotationally seated at a frame 42 and is driven by a motor 43. These details of the inventive turning station 40 are shown in the side view in FIG. 3*a*. The frame 42 is seated in a stand 45.

For clarity, only the details of letter turning box 41 and stand 45 of the inventive turning station 40 are shown in the front view in FIG. 3*a*. The letter turning box 41 is shown in a first letter acceptance position with bold-face lines and in a second letter delivery position shown with thin lines. In the first letter acceptance position, the upper edge of the letter turning box 41 assumes a negative angle $0°<-\alpha\leqq 45°$ with respect to a line parallel to the letter transport direction (X-direction) (also parallel to the placement edge 31), so that the letter 3 accepted after a first pass slides against a detent 49 of the letter turning box 41. A sensor 50 for detecting an envelope 3 accepted in the turning box 41 is arranged at the stand 45 of the turning station 40.

In the second letter delivery position shown with thin lines, the upper edge of the letter turning box 41 assumes a positive angle $45°\geqq\beta\geqq 20°$ with respect to a line parallel to the letter transport direction (X-direction) and placement edge 31, so that the envelope 3, rotated for a second pass, slides back onto the conveyor belt 10 of the printer device 20.

The letter turning box 41 is composed of a back wall 412 and a lower seating surface 411 and an upper seating surface 413, and is open at the sides for the letter admission and delivery. The letter turning box 41 has a back wall 412 slanted out of the vertical to such an extent (angular range $5°<\gamma<45°$) that the letter, due to its weight, exerts a force component onto the back wall 412 and thus lies against it, whereas its lower edge rests on the lower seating surface 411. The angle y relative to the vertical is preferably 18°. The outside dimensions of the letter turning box 41 are based on the largest letter formats that are to be accepted and rotated within it. An arriving letter is detected by a sensor 50. The sensor 50 is preferably a reflection light barrier arranged in a recess 44 of the frame 42, and is opposite a recess 414 of the letter turning box 41 only in the acceptance position of the letter turning box 41. The sensor 50 thus detects an accepted letter through these recesses 44 and 414 of the frame 42 and of the letter turning box 41. The rotational drive is an electric motor 43 and appertaining sensors 51, 52 that detect when the respective limit positions are reached given a rotation corresponding to the letter admission/delivery position. The rotation ensues counter-clockwise around a pivot point DP1 that lies in the upper half of the back wall 412. The back wall 412 can be divided into four quadrants. For an arrangement of the letter turning station 40 downstream following the printer device 20, the pivot point DP1 lies in the second quadrant, preferably close to a diagonal between the corners of the letter turning box 41, whereby one of the two comers being the detent 49.

The sensors 50, 51 and 52 and the motor 43 of the letter turning station 40 are connected via an interface circuit 18 to a control unit 1 (shown in FIG. 4*b*) that correspondingly operates the motor 43, which moves the turning box 41 into the second letter delivery position. The control unit 1 receives a signal from a sensor 37 when the letter has been supplied to the printer device 20 from the right. On the basis of this signal, the motor 43 of the letter turning station 40 is operates such that the letter turning box 41 re-assumes its first letter acceptance position.

For an arrangement of the letter turning station 40 upstream preceding the printer device 20, as required for the method version according to FIGS. 2*a* and 2*b*, the structure shown in FIG. 3*a* is mirrored around the indicated vertical axis to obtain a fundamentally identical but mirror-symmetrical arrangement that is not separately shown.

Figure 3B:
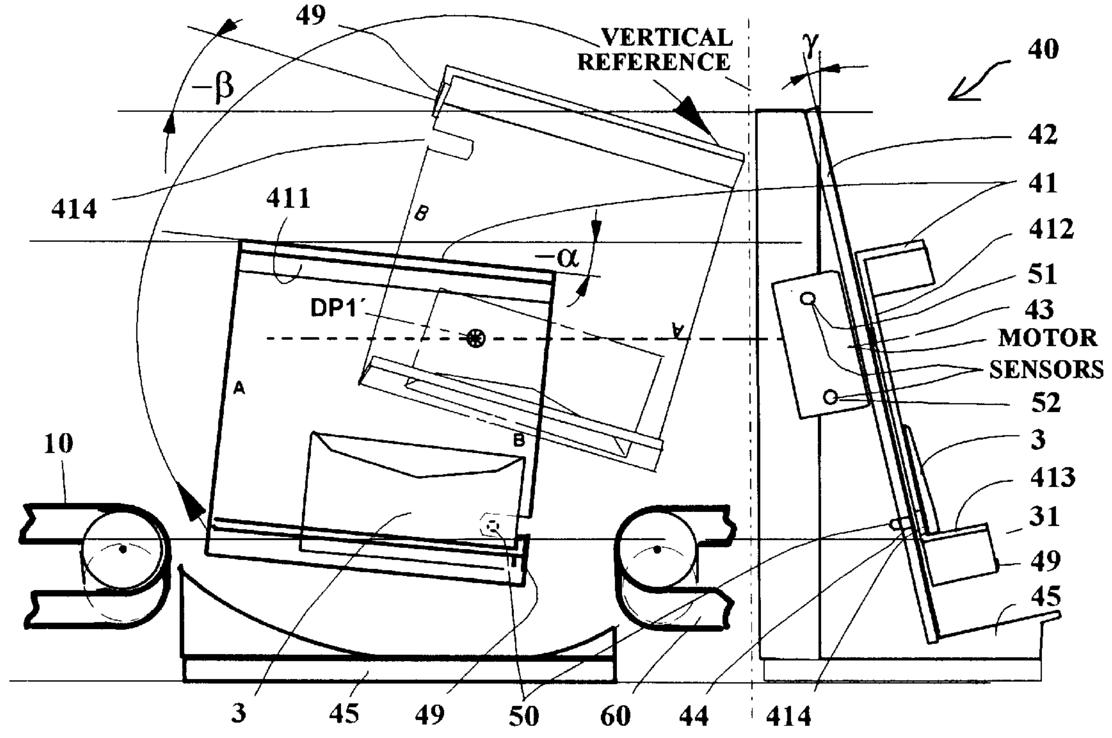
FIG. 3*b* is an "unfolded" front and side view of a further version of the first embodiment of a mail processing system in accordance with the invention.

Another version of the arrangement of the letter turning station 40 is shown in FIG. 3*b* and is suitable for an arrangement of the letter turning station 40 of FIG. 5*b* anywhere in the mail stream preceding or following the printer device 20. (the front views (left) and side view (right) are again shown "unfolded" around a vertical axis.) The letter is accepted at the one side of the letter turning station 40 but is delivered at the other side of the letter turning station 40. To this end, the pivot point DP1' lies in the upper box half in the first quadrant, preferably close to a diagonal between two comers of the letter turning box 41, with neither of these two corners being the detent 49. In this version, the letter turning station 40 is likewise composed of a letter turning box 41 that is rotationally seated in a frame 42 and is driven by a motor 43. These details of the inventive turning station 40 are again shown in a side view in FIG. 3*b*, with the letter turning box being shown bold-faced in the letter acceptance position. In the first letter acceptance position, the upper edge of the letter turning box 41 assumes a negative angle $0°<-\alpha\leqq 45°$ with respect to a line parallel to the letter transport direction (X-direction) and to the placement edge 31, so that the envelope 3 accepted after a first pass slides against a detent 49 of the letter turning box 41. The acceptance of the letter 3 is detected by a sensor 50, whereupon the control unit 1 causes the motor 43 to rotate the turning box 41 in the clockwise direction. In the second letter delivery position shown with thin lines in FIG. 3*b*, the upper edge of the letter turning box 41 also assumes a negative angle 45°≧−β≧20° with respect to a line parallel to the letter transport direction (X-direction) or, respectively, placement edge 31, so that the rotated envelope 3 slides farther onto the conveyor belt 60 of a following transport device.

Figure 3C:
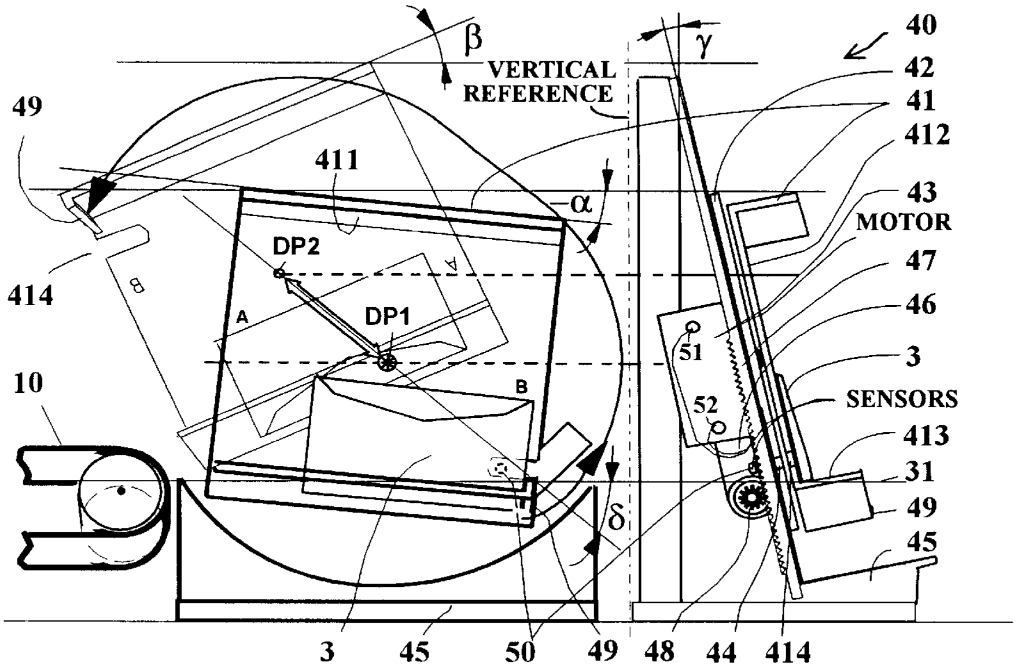
FIG. 3*c* is an "unfolded" front and side view of a another version of the first embodiment of a mail processing system in accordance with the invention.

In another version of the arrangement with approximately vertical letter transport, shown in FIG. 3*c* (again with "unfolded" front (left) and side (right) views), the letter turning station 40 is likewise composed of a letter turning box 41 that is rotationally seated in a frame 42 and is driven by a motor 43. These details of the inventive turning station 40 are shown in a side view in FIG. 3*c*. The frame 42, however, is additionally seated so as to be displaceable in a stand 45 by a motor 46.

For clarity, only the details of the letter turning box 41 and of the stand 45 of the inventive turning station 40 are again shown in the front view in FIG. 3*c*. The letter turning box 41 is shown in a first letter acceptance position shown with bold-face lines and in a second letter delivery position shown with thin lines. In the first letter acceptance position, the upper edge of the letter acceptance box 41 assumes a negative angle 0°<−α≦45° with respect to a line parallel to the letter transport direction (X-direction) and to the placement edge 31, so that the envelope 3 accepted after a first pass slides again against the detent 49. In the second letter delivery position shown with thin lines, the upper edge of the letter acceptance box 41 assumes a positive angle 45°≧β≧30° with respect to a line parallel to the letter transport direction (X-direction), so that the envelope 3 rotated for a second pass, slides back onto the conveyor belt 10 of the printer device 20. In this preferred embodiment, the letter turning box 41 is guided counter-clockwise approximately on the path of an ellipse by the rotational drive 43 and the drive 46, with the major axis of this ellipse being oriented at an angle δ or—in the simplest case—perpendicular to the transport direction. For such a drive, for example, the motor 46 (which is preferably an electric motor) is coupled, possibly via a translational gearing, to a gear wheel 48 that engages a toothed rack 47. The toothed rack 47 is secured in the stand 45 at the angle δ<45° relative to the transport direction. The frame 42 for the letter acceptance box 41 is firmly connected to the drives 43 and 46 and slides on guide rails (not shown) in conformity with the angle δ on a straight line parallel to the toothed rack 47 when the drive 46 is activated.

Of course, forms of motion other than elliptical are also suitable for the rotary movement as long as they enable the required interplay of forces in the fundamentally same way. Given separate employment of one motor 43 for the rotary motion and two motors for the displacement within the guide plane (X/Y-plane), i.e. a drive motor 46x in the X-direction and a drive motor 46y in Y-direction, an optimum curved shape of the resulting motion can be achieved. As an alternative drive arrangement, a single motor having a known lever and gear arrangement for producing elliptical curved paths is also suitable. Whatever drive arrangement is used should produce an accelerating force in a direction perpendicular to the transport direction, or at the angle δ, which acts on the letter 3 and on the turning box 41, whereas the centrifugal force acting on the letter 3 at the beginning of the rotation is not yet or no longer effective. During the rotation, the letter 3 lies on the lower seating surface 411 of the letter acceptance box. The rotary and displacement motion component of the letter turning box decreases to such an extent before the upper reversing point of the ellipse that the rotated letter can again generally follow the effect of the force of gravity. Alternatively, the displacement motion component of the letter turning box 41 can be reversed in direction. This is especially required for a version with horizontal letter transport. As needed, a motion can be implemented that conveys the letter 3 from the one seating surface 411 to the other seating surface 413. Such a version of the arrangement is therefore also fundamentally suited for an application with lying (horizontal) letter transport in the system.

During a rotation, the centrifugal forces acting on the center of gravity of the letter are adequately high compared to other forces, for example the perpendicularly downwardly acting force of gravity. Due to the centrifugal force acting in the rotary motion, the letter 3 is applied against the seating surface 411 of the letter acceptance box 41 and is rotated farther thereby. The abatement of rotation beginning in the next motion phase results in the perpendicularly downwardly directed force of gravity overcoming the centrifugal force and static friction on the back wall 412. Decelerated by the sliding friction on the back wall 412, the letter 3 slides down until it is supported by the rotated (originally upper) seating surface 413 of the letter turning box 41 and slides farther therefrom onto the conveyor belt 10. This latter sliding event is supported by the final position of the letter turning box 41, whose seating surface 413 again assumes an angle β relative to a line parallel to the letter transport direction (X-direction).

An advantage of all versions of the letter turning box 41 is that the letter need not be clamped or suctioned by additional means during the rotation in order to prevent it from sliding through the open sidewalls of the letter acceptance box 41. The described force relationships and the resulting letter motion are independent of size and weight of the letter 3 within broad limits.

Figure 4B:
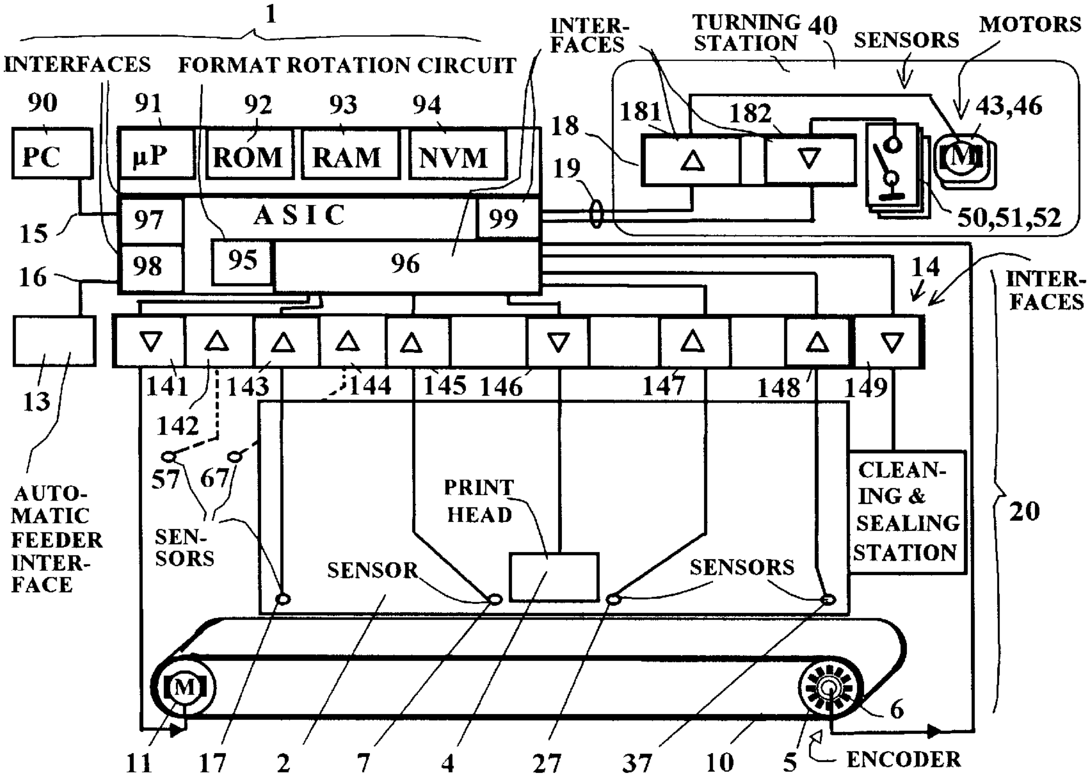
FIG. 4*b* is a schematic block diagram of the components of the printer device and the turning station in the mail processing system of the invention.
Figure 4A:
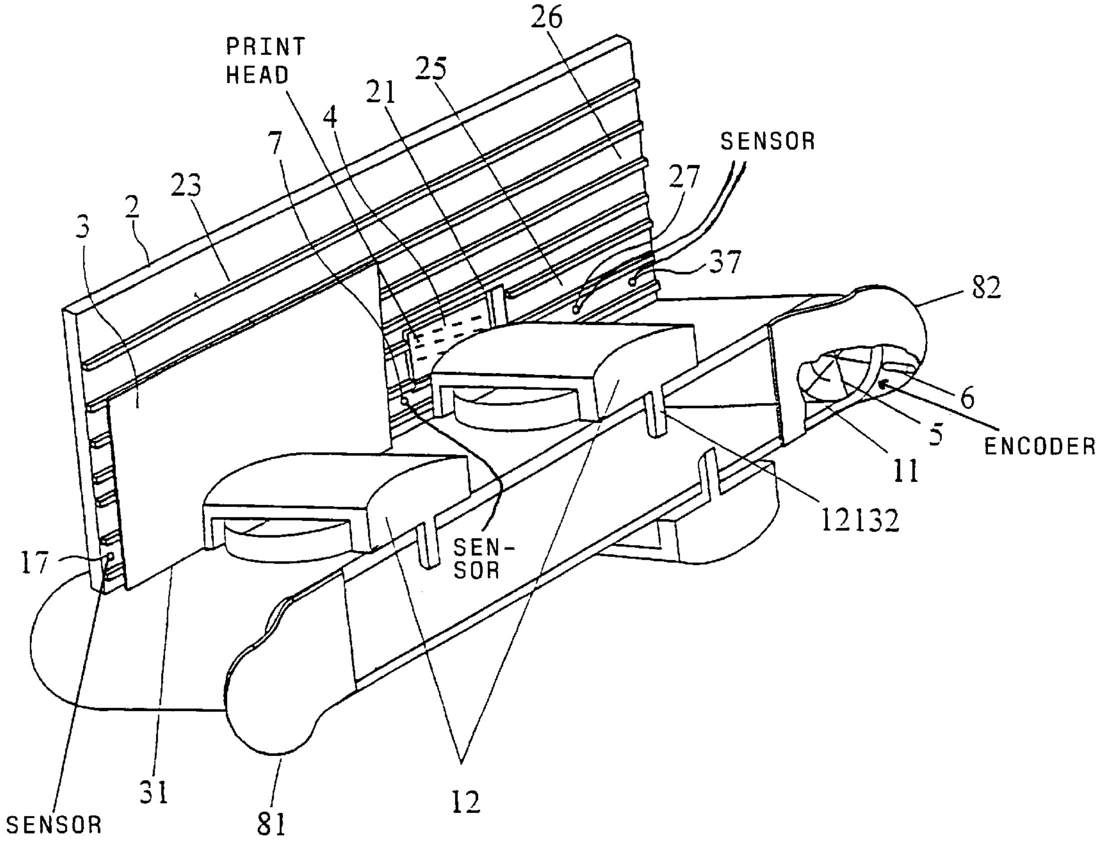
FIG. 4*a* is a perspective view of a printer device for use in the mail processing system of the invention.

FIG. 4*a* shows details of the inventive printer device 20 for printing an envelope 3 standing on an edge 31. The printer device 20 includes a conveyor belt 10, a guide plate 2 arranged orthogonal to the transport plane and above it, and an ink print head 4. The letter is turned over and rotated such that its largest surface lies against the guide rails 23 of the guide plate 2. The guide plate 2 is preferably inclined at an angle γ=18° to the perpendicular. The guide plate 2 and conveyor belt 10 describe an angle of 90° with one another. The letters 3 standing on the conveyor belt 10 necessarily lie against the guide plate 2 due to the slanting attitude thereof and are also pressed against it by pressure elements 12 that are secured on the conveyor belt 10. Given movement of the conveyor belt 10, the letters 3, entrained by the elements 12, slide along the guide rails 23 of the stationary guide plate 2. A projection 12132 of each of the elements 12 slides on a connecting link with the deflectors 81 and 82, so as to press and release the letter 3 before and after printing, respectively. A recess 21 for the ink print head 4 is provided in the guide plate 2. In the region 25 following the recesses 21, the guide plate 2 is set back downstream in the conveying direction to such an extent relative to the seating surface for the letter 3 that the printed surface is sure to lie free.

Due to the symmetrical structure of the conveyor belt 10 with the elastic pressure elements 12, the letter can be seized and transported under completely identical conditions in both motion directions. Sensor 7 and 17 serves for recognizing the start (leading edge) of the letter 3 and for triggering printing as the letter 3 proceed in the transport direction. Sensor 27 and 37 serves for recognizing the start of the letter and for triggering printing given an upstream letter transport motion, i.e. opposite the usual transport direction. The transport arrangement is composed of the conveyor belt 10 and two drums 11. One of the drums 11 is the drive drum. Both drums 11 are preferably toothed drums and the conveyor belt 10 is correspondingly implemented as a toothed belt, which achieves positive force transmission. The drive drum 11, with an incremental sensor 5, is firmly seated on an axle. The incremental sensor 5 is , for example, a slotted disk that interacts with a light barrier 6 to form an encoder which generates encoder pulses representing the distance traversed by the belt 10 as it proceeds in the transport direction (or in the opposite direction).

FIG. 4*b* shows a block circuit diagram of the drive of the printer device 20 and the letter turning station 40. The control unit 1 includes a microprocessor 91 and known memory means 92, 93, 94 and a personal computer PC with a data bank 90 for storing the address data files and appertaining user interface (keyboard, display unit). The personal computer PC is in communication with the microprocessor 91 via a data cable 15 and an interface circuit 97. The control unit 1 also has interface circuits 96, 14 at least to the sensors 6, 7, 17, 27, 37 and to the actuators, for example a drive for the drum 11 and a cleaning and sealing station RDS for the ink jet print head, as well as to the print head 4 of the printer device 20. The fundamental arrangement and the interplay between ink jet print head 4 and the RDS are described in German Application 197 26 642.8 assigned to the present assignee.

Via the interface circuit 14, a d.c. motor connected to the drive drum 11 can be supplied with a voltage of either polarity and can be operated in forward and reverse rotational directions. The generation of a print rotated format can ensue with a format rotation circuit 95 that is connected to the microprocessor 91, the memories 92, 93 and 94 and to an interface 96. The individual print elements of the print head 4 are connected within its housing to a print head electronics, and that the print head 4 can be driven for a purely electronic printing.

A further interface circuit 99 is connected via a data cable 19 to an interface circuit 18 of the letter turning station 40 and allows the control thereof by the control unit 1. Corresponding sensors 50, 51, 52 and actuators for the motors 43, 46 of the letter turning station 40 are connected to corresponding interface transmission/reception circuits 181,182. Another peripheral device such as an automatic feeder station 28, has an interface circuit 13 connected via a cable 16 to an interface circuit 98 of the control unit 1. German Application 197 11 997.2 discloses an embodiment for a number of peripheral devices (stations) that is suitable for the peripheral interface connections.

The interfaces 96, 97, 98 and 99 and the format rotation circuit 95 can be incorporated in an ASIC.

The first version of the method, shown in FIG. 1*a*, is characterized that by seating of the letter for the second pass ensuing at the right side of the machine. As was shown in FIG. 1*b*, the letter transport direction can switch again after the completion of the address printing in the second pass and can then conduct the completely printed letter out at the right side of the machine. This executive sequence has the advantage that the left side of the machine is not affected by the second pass of the letter. When, for example, the left side is equipped with a letter separating means, this function is not disturbed. In particular, the sequence of the outgoing mail deposited there as a stack is not changed.

A dynamic scale 24, and franking and addressing machine FAM coupled with a PC and with a turning station 40. The automatic feeder station 28 has an end plug 29 at the left that electrically terminates the device interface. The right device interface is connected via a cable 16.2 to the left device interface of the dynamic scale 24, whose right device interface is coupled via a cable 16.1 to the left device interface of the franking and addressing machine FAM. The left device interface of the turning station 40, whose left device interface is terminated with an end plug 30, is connected to its right device interface via a cable 19. This system is capable of operating on a stack of mixed mail to automatically separate and weigh the items. The automatic feeder 28 separates letters from a stack and conducts them to the postage meter machine base station with the printer device 20, i.e. it serves as a letter applier. If the letter stack is composed of letters of different letter weights that respectively require different postage fees, the additional employment of the dynamic scale 24 is meaningful in order to determine the respective letter weights. The dynamic scale 24 allows a higher throughput of different mailings (mixed mail) for an automatic mail processing. Differing from the first version of the method (according to FIG. 1*a*), the sequence of the addressing or franking functions to be inventively sequentially implemented is reversed given the version of the arrangement shown in FIG. 5*a*.

The method for the combined franking and address printing includes the following steps:

Step 100, input of the address into the control unit 1 of the franking and addressing machine FAM;

Step 101, delivery of a letter 3 belonging to the address to an initial transport position, so that the letter 3, turned over standing on edge, is applied to the guide plate 2 or a placement point at the left side of the printer unit 20 of the franking and addressing machine FAM;

Step 102*c*, switching the franking and addressing machine FAM to franking, whereby the print head 4 of the printer unit 20 is charged with a non-rotated franking print format, so that the franking print format is printed on the letter surface column-by-column from right to left in a known way in the first pass while the letter transport ensues downstream in transport the direction to the turning station 40;

Step 103, delivery of the letter 3 to the turning station 40;

Step 104, rotating the letter 3 in the turning station 40, whereby the letter 3 is turned by 180° in the plane of its flat sides;

Step 105*a*, delivery of the letter 3 for renewed application to the printer means 20;

Step 106*c*, generating the print format for the address in the control unit 1 and implementation of a second pass with address printing, whereby the print head 4 of the printer unit 20 is charged with a print format by 180°, and whereby the transport direction is reversed, so that the address is printed column-by-column from left to right on the letter surface, and whereby the letter 3 is transported back upstream to the initial transport position preceding the placement point to the printer means 20;

Step 107*c*, removal of the franked and addressed letter 3 transported back to the initial transport position.

In this version of the method shown in FIG. 5*a*, the letter is applied turned over but not rotated in order to implement the franking first. After the first pass, it is inventively detected in the turning station 40 and is applied to the right side of the franking and addressing machine FAM rotated by 180° and drawn in for the second pass, with the address now printed. The letter detection by a sensor 50 initiates the FAM to output address request data to the personal computer PC. The PC contains the sequence of specific letter recipient addresses stored in a file that are usually selected from the address data bank 90. The PC communicates the addresses in the required sequence in which the pieces of mail have been applied in the stack to the franking and addressing machine FAM. This franking and addressing machine FAM, which generates a print format rotated by 180°, now prints the generated print format on the surface of the letter 3 from left to right, whereby the letter 3 is transported through the printer device 20 from right to left. The dynamic scale 24, which had determined the weight in the first pass for determining the postage value, then serves as a sensor for the removal of the letter from the scale 24 after the second pass. The control unit 1 of the franking and addressing machine FAM controls the automatic feeder station 28 for the purpose of feeding a next-successive, separated letter only after the removal of the current letter 3 has been detected.

Given employment of an ink jet print head that operated without a pressing device, dog elements must be used which, on the basis of shape and arrangement of each letter 3, enable a positionally exact letter transport in the opposite direction. The print head 4 is installed motion-neutral relative to the envelope surface to be printed and relative to the transport arrangement. An arrangement at the angle of 90°, i.e. perpendicular on the envelope surface, is preferred. The employment of an ink jet print head has the advantage that no contact with the envelope surface is required during printing. In any case, the print head must have a printing width that corresponds to the width of the wider of the two print formats. At 35 mm, that would usually be the address print, whereas a franking imprint is not wider than 30 mm. Various solutions are possible for switching the letter transport direction:

a) reversible motor b) switchable gearing c) two oppositely working drives (for example, two rollers successively arranged), with only one being active at any time.

The switching of the motion direction can be undertaken manually, for example via the keyboard of the connected personal computer PC, or automatically dependent on the letter feed. This latter version can be advantageously realized as follows: Sensors 7, 17, 27 and 37, for example reflection light barriers, that detect the letter edge are arranged at both sides of the machine at which the letter can be employed. When a sensor 7 or 37 at the one side of the machine responds, a corresponding letter introduction at this side is signaled. Given the version of the arrangement shown in FIG. 5*a*, an automatic switch is made to the franking mode given a signaling of the letter introduction at the left side, whereas a switch is made to the addressing mode given a signaling at the right side. In order to prevent a sensor at the other side from triggering a renewed switching when a letter passes, at least two sensors are arranged in immediate succession at each side. The sequence of the signals of these two sensors unambiguously defines the letter transport direction. In the version according to FIG. 5*a*, the sequence of the franking imprint ensuing in the first pass and the address printing ensuing in the second pass requires that the characters be printed upside down (compared to "normal" printing) standing on head when printing in the second pass, and printing is begun with what is the last printing column of a character in the sequence compared to the first pass. This sequence can also be executed vice versa (as FIG. 1*a* shows).

The processing of mail stacks can also be advantageously realized with an alternative version, shown in FIG. 5*b*. Analogous to FIGS. 3*b*, the turning station 40 is fashioned for incorporation into a mail processing system whose printer unit 20 has a transport arrangement that only has to transport a letter downstream. The necessity of switching the motion direction of the letter transport mechanism is thereby eliminated. The sensors 7 and 17 at the left side suffice for detecting the letter edge. An additional sensor combination 57, 67 that determines the existence of a first imprint (if present) can be arranged upstream before the sensors 7 and 17 for an automatic recognition of the first or second letter pass. The additional sensor arrangement can be implemented as reflection light barriers that detect the different types of reflection from the letter surface and any printed characters thereon. The positioning of the sensor arrangement is selected such that, if made, the first imprint, after rotation of the letter 3 and re-application, comes to lie directly under it.

This method for the combined franking and address printing is characterized by the following steps:

Step 100, input of the address into the control unit 1 of the franking and addressing machine FAM;

Step 101, delivery of an letter 3 belonging to the address to an initial transport position, so that the letter 3, turned over standing on edge, is applied to the guide plate 2 or a placement point at the left side of the printer unit 20 of the franking and addressing machine FAM;

Step 102*c*, switching the franking and addressing machine FAM to franking, whereby the print head 4 of the printer unit 20 is charged with a non-rotated franking print format, so that the franking print format is printed on the envelope surface column-by-column from right to left in a known way in the first pass while the letter transport ensues downstream in transport direction to the turning station 40;

Step 103*c*, delivering at least one letter 3 to the turning station 40;

Step 104*c*, rotating the at least one letter 3 in the turning station 40 by 180° in the plane of its flat sides;

Step 105*c*, delivering the at least one letter 3 for renewed application to the printer unit 20 of the franking and addressing machine FAM;

Step 106*d*, generating the print format for the address in the control means 1 and implementation of a second pass with address printing, whereby the printer unit 20 is charged with a print format rotated by 180°, and whereby each letter 3 is transported through the printer unit 20 in the second pass in the same direction as the first letter pass and is printed column-by-column from right to left with the rotated print format;

Step 107, removal of the franked and addressed letter 3 from an output point of the printer unit 20.

Franking ensues in a known way in the first pass. The address is printed in the second pass, to which end the print control ensues in a modified manner. Differing from the versions of the method explained in FIGS. 1*a* through 2*b*, a rotation of the characters to be printed by 180° and with corresponding reversal of the characters in every row, i.e. a rotation of the print format by 180° as a final result, is not required in the first pass, but takes place in the second pass in order to be able to legibly print the printed characters in the second pass. The letter rotation required before the second pass can ensue anywhere in the return loop. It is possible to fashion a letter turning station 40 for stacked letters (mixed mail). Stacked mixed mail is transported from a deposit box 22 to the turning station 40 and is rotated therein by a total of 180°. According to the version shown in FIG. 5*b*, the rotation of the letter is implemented in the mail stream following or preceding the printer, unit 20. The franking ensues in a standard way in the first pass. The letter rotation then only has to be taken into consideration in the printing in the second pass.

Figure 6A:
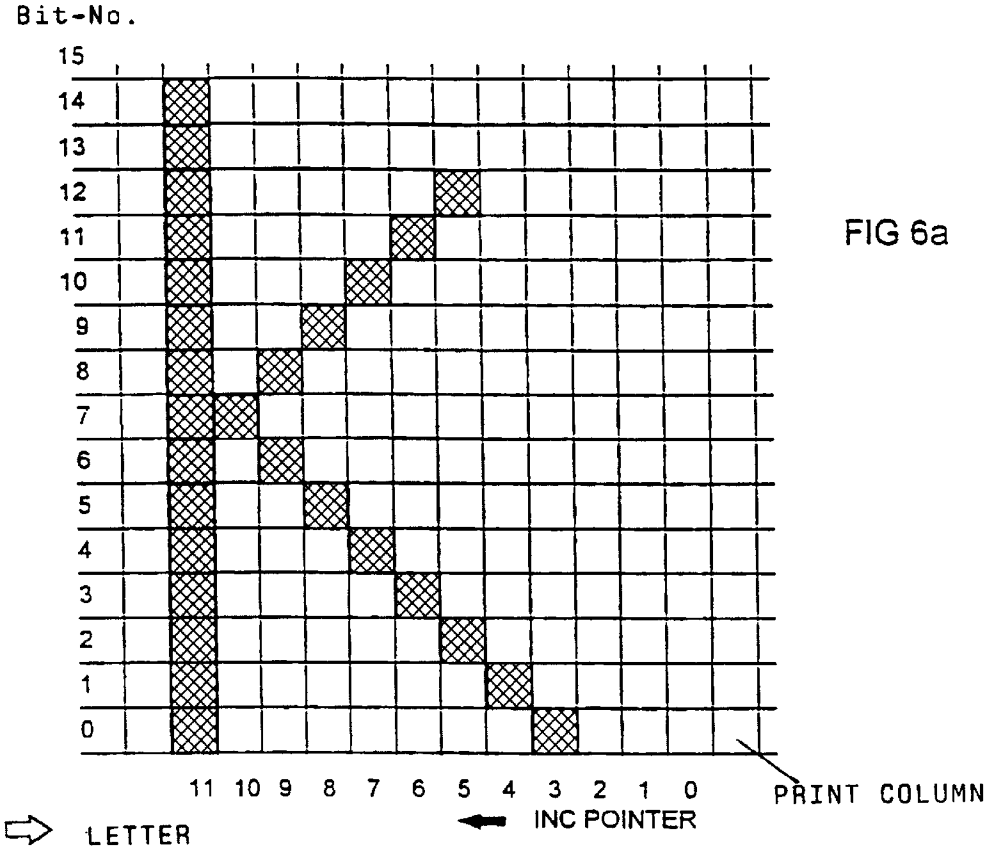
FIG. 6*a* illustrates the imprint of the character "k" after a first letter pass in a first direction in the mail processing system of the invention.
Figure 6B:
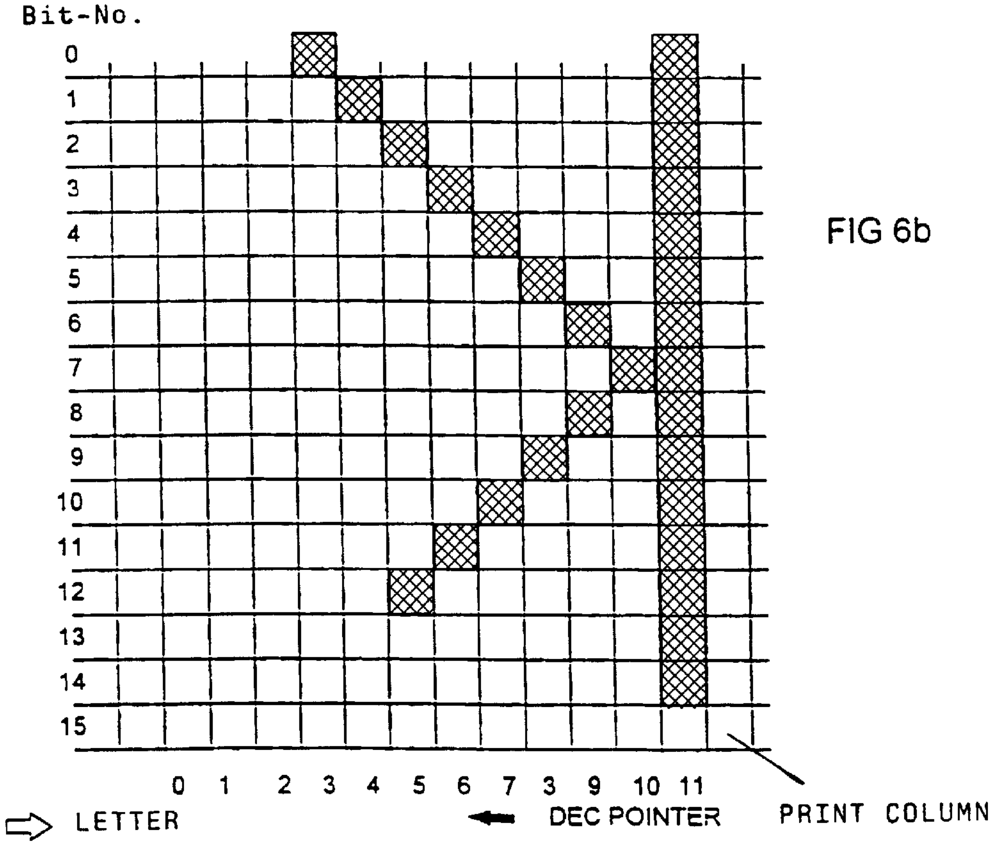
FIG. 6*b* shows the imprint of the character "k" immediately after a second letter pass in a second direction, opposite to the aforementioned first direction, in the mail processing system of the invention.

FIGS. 6*a* and 6*b* illustrate the print control for various modes with reference to the example of FIG. 5*b*, whereby the printer unit 20 needs only to transport a letter downstream. The characters to be printed, for example ASCII text characters, are stored in character memory areas. The graphic print data corresponding to the characters are stored under address n allocated to the character x. The bit sequence of the data addressed in this way images the black-and-white pattern of a printing line of this character to be printed. The number of data bytes is dependent on the graphic resolution. Two bytes per print column suffice for applications in the address area, and 12 such columns form, for example, one character. When the data for a print column are read out, the address pointer is incremented and activates the next data bytes n+1, etc., until a character with all 12 columns has been finally read out. A specific program is called when switching the franking mode to the second letter pass, this inventively effecting that the address pointer for the character x is set to n+11 (the last column of the character, and is decremented according to the number of columns (12 in the example) until it stands at n+0.

The sequence of the characters is stored in a memory known as a text memory, whose contents are the addresses for the aforementioned pointers. Since the texts of the franking imprint always differ from those of the address imprint, the texts are inventively stored in two different memory areas, with only the memory needed for the mode being accessed. For the franking imprint, the texts are stored in sequence in the main memory RAM 93 from which they are also printed in the first letter pass, i.e. a corresponding character resides in the first memory location to be read out. The characters of the address imprint, by contrast, are stored in reverse sequence, i.e. the last character resides in the first memory location to be read out. The sequence of the characters in the inventive generation of the print format is modified according to the print job. The program controlling this mode-specific generation is stored in the read-only memory ROM 92 for the microprocessor 91. The non-volatile memory NVM 94 stores the letter recipient address that is directly entered into the FAM by keyboard or that was previously communicated from the PC, which has the data bank 90. Corresponding to the information stored in the NVM 94, the required character is fetched from the character memory area of the read-only memory ROM 92 in the required sequence upon generation by the microprocessor 91 and rotated as needed. In addition to reversal of the time sequence of the columns to be printed, a rotation of the characters to be printed by 180° is also required for the address printing, i.e. the bit number 15 for the originally uppermost printing position now determines precisely the lowest printing position of the corresponding character. The bit sequence corresponding to a printing column is inventively read into a shift register. This storage can ensue serially or in parallel, parallel storage being preferred for reasons of working speed. The shift register then rotates (reverses) in exactly the direction in which the bit read in first is read out last, etc. The sequence of the print signals within a printing column is thereby rotated by exactly 180°. The rotation of the shift register ensues in the opposite direction for the first pass, i.e. the first bit read in is also read out as first print signal and conducted to the printer unit. Alternatively, the employment of a shift register having only one rotational direction is also possible. In the version, the data flow for the first letter pass is conducted past the shift register.

The effect of the method is graphically shown in FIGS. 6*a, b* for the character "k" as an example. FIG. 6*a* shows the imprint of a character "k" immediately after the first letter pass. Here, the letter k is, for example, a component of a text line of the advertizing slogan. FIG. 6*b* shows the imprint of a character "k" immediately after the second letter pass, whereby the letter k is, for example, a component of a text line of the letter recipient address. The character "k" for the letter k is always read out from the same character memory area of the ROM 92 and is rotated for the second imprint.

The physical realization of the above-described methods of reversing the time sequence of the columns to be printed and rotating the print columns themselves are possible in various versions. The implementation with discrete components contains at least one ROM 92 as an addressable memory, a main memory RAM 93 and a specific circuit 92 with a binary counter as a pointer, with a shift register and a clock generator. The implementation of this discrete structure in an ASIC is especially advantageous for greater item counts to be processed, having the advantage of lower assembly outlay and high dependability. The alternative, program-controlled implementation of the method, employs a micro-controller that, for example, generally executes the functions of a CPU, ROM and clock generator. A number of internal registers of the CPU serve as the register, at least one thereof being also capable of rotating left and right with appropriate commands.

The printer device 20 can also be realized differently from the embodiments explicitly described herein.

Although modifications and changes may be suggested by those skilled in the art, it is the intention of the inventor to embody within the patent warranted hereon all changes and modifications as reasonably and properly come within the scope of his contribution to the art.

I claim as my invention:

1. A mail processing system comprising:

a digital printer device having a single print head, said printer device receiving print control signals which cause said print head to print an imprint, having a print format, on a print medium having flat sides;

transport means for moving a print medium past said print head in successive first and second passes;

a turning station connected to said transport means for receiving a print medium from said transport means after said first pass with a first print medium and for returning said print medium to said transport means for said second pass with a second print medium orientation which is rotated in a plane containing said flat sides by 180° relative to said first print medium orientation;

control means, connected to said printer device, for generating said print control signals and for supplying said print control signals to said printer device, said control means comprising means for generating print control signals representing a first print form, with first format top and bottom, for printing said imprint in said first pass and for generating print control signals representing a second print format, with a second format top and bottom rotated relative to said first print format top and bottom by 180°, for printing said imprint in said second pass; and sensor means, connected to said control means, for detecting a print medium and for generating a sensor signal identifying whether the detected print medium is in said first pass or said second pass, said sensor means supplying said sensor signal to said control means and said control means supplying print control signals to said printer device representing said first print format or said second print format dependent on whether the detected print medium is in said first pass or said second pass.

2. A mail processing system as claimed in claim 1 wherein said first print format comprises a franking format and said second print format comprises an address format.

3. A mail processing system as claimed in claim 1 wherein said first print format comprises an address format and wherein said second print format comprises a franking format.

4. A mail processing system as claimed in claim 1 wherein said turning station comprises a turning box, adapted to receive a print medium, and a rotary drive connected to said turning box for rotating said turning box through said 180°, and a first sensor which generates a first sensor signal if said turning box is at a beginning of said 180° and a second sensor which generates a second sensor signal if said turning box is at an end of said 180°, said first and second sensors of said turning box being connected to said control means and said control means being connected to said rotary drive, said control means comprising means for operating said rotary drive to rotate said turning box between a first position at said beginning of said 180° for receiving a print medium and a second position at said end of said 180° for releasing said print medium.

5. A mail processing system as claimed in claim 4 wherein said turning box has a back wall, rotatable by said rotary drive, and an upper seating surface and a lower seating surface on said back wall, said lower seating surface having a comer with a detent for arresting a print medium lying on said lower seating surface and against said back wall, said back wall having open sides allowing unimpeded passage of a print medium and said back wall being inclined relative to a vertical reference at an angle γ, with 5°γ<45° so that a print medium exerts a force against said back wall while lying against said lower seating surface.

6. A mail processing system as claimed in claim 5 wherein said turning station has a frame at least partially straddling said turning box, said back wall having a recess therein, and a third sensor having a light transmitter and a light receiver, said light transmitter transmitting a light beam through said recess to said light transmitter unless blocked by a print medium lying against said back wall, said third sensor being connected to said control means and supplying a third sensor signal to said control means identifying a presence of a print medium on said turning box.

7. A mail processing system as claimed in claim 4 wherein said rotary drive comprises an electric motor attached to said back wall at a pivot point around which said rotary drive rotates said back wall, said pivot point being disposed in an upper half of said back wall when said back wall is in said first position.

8. A mail processing system as claimed in claim 7 wherein said turning station is disposed downstream following said printer device, and wherein said pivot point is disposed in a quadrant of said back wall adjacent a side of said back wall at which a print medium is received when said turning box is in said first position, and said pivot point being disposed proximate a diagonal of said back wall extending between two corners of said back wall, with one of said two comers being the comer at which said detent is disposed, and wherein said rotary drive comprises means for rotating said back wall counter-clockwise around said pivot point from said first position to said second position.

9. A mail processing system as claimed in claim 7 wherein said turning station is disposed upstream preceding said printer device and wherein said pivot point is disposed in a quadrant of said back wall adjacent a side of said back wall from which a print medium exits when said back wall is in said second position, and said pivot point being proximate a diagonal of said back wall extending between two comers of said back wall, neither of said two comers being the comer at which said detent is disposed, and wherein said rotary drive comprises means for rotating said back wall clockwise around said pivot point from said first position to said second position.

10. A method for printing imprints having two different print formats on a print medium using a single print head of a printer device, comprising the steps of:

moving a print medium, having flat sides substantially in a common plane, past a single print head in successive first and second printing passes;

after said first printing pass, supplying said print medium in a plane containing said flat sides to a turning station and in said turning station mechanically rotating said print medium from a first orientation through 180° to a second orientation for said second printing pass;

supplying print control signals representing a first print format, with a first format top and bottom, to said print head for printing an imprint with said first print format in said first printing pass and supplying print control signals representing a second print format, with a second format top and bottom rotated relative to said first format top and bottom by 180°, for printing an imprint with said second print format in said second printing pass; and detecting whether said print medium is in said first printing pass or said second printing pass and controlling supply of said print control signals to said print head dependent on whether said print medium is in said first printing pass or said second printing pass.

11. A method as claimed in claim 10 comprising printing a franking imprint as said first print format in said first printing pass and printing an address as said second print format in said second printing pass.

12. A method as claimed in claim 11 comprising printing an address as said first print format in said first printing pass and printing a franking imprint as said second print format in said second printing pass.

13. A method as claimed in claim 10 wherein said printer device has opposite sides, and wherein said first and second printing passes proceed into said printer device from said opposite sides, respectively.

14. A method as claimed in claim 13 wherein each of said first and second print formats comprises a plurality of print columns, and, when read from left to right, has a left-most column and a right-most column, comprising the steps of:

providing a control unit which generates said print control signals and entering an address into said control unit;

supplying a print medium on which the address is to be printed as said imprint to a left of said opposite sides of said printer device;

conducting said first printing pass of said print medium past said print head while supplying print control signals representing the address as said first print format to said print head;

printing said address as said first print format on said print medium column-by-column starting with said left-most column of said first print format and ending with said right-most column of said first print format;

in said turning station, rotating said print medium by 180° in said plane containing the flat sides of said printing medium;

supplying said print medium into said printer device at a right of said opposite sides of said printer device;

conducting said second printing pass of said print medium past said print head and printing an imprint with said second print format column-by-column on said print medium starting with a said left-most column of said second print format ending with said right-most column of said second print format; and removing said print medium with said imprint in said first print format and said imprint in said second print format thereon from said left side of said printer device.

15. A method as claimed in claim 10 wherein said printer device has opposite sides, and wherein said first and second printing passes proceed from a same one of said sides.

16. A method as claimed in claim 15 wherein each of said first and second print formats comprises a plurality of print columns, and, when read from left to right, has a left-most column and a right-most column, comprising the steps of:

providing a control unit which generates said print control signals and entering an address into said control unit;

supplying a print medium on which the address is to be printed as said imprint to a left of said opposite sides of said printer device;

conducting said first printing pass of said print medium past said print head while supplying print control signals representing said address as said first print format to said print head;

printing said address as said first print format on said print medium column-by-column starting with said left-most column of said first print format and ending with said right-most column of said first print format;

in said turning station, rotating said print medium by 180° in the plane containing the flat sides of said printing medium;

supplying said print medium into said printer device at said left side of said printer device;

conducting said second printing pass of said print medium past said print head and printing an imprint with said second print format column-by-column on said print medium starting with said right-most column of said second print format and ending with said left-most column of said second print format; and removing said print medium with said imprint in said first print format and said imprint in said second print format thereon from said left side of said printer device.

17. A method as claimed in claim 10 comprising the steps of:

initially supplying a print medium to said printer device from a first side of said printer device;

conducting an auxiliary pass of said print medium past said print head without printing on said print medium; and after said second printing pass, removing said print medium from a second side of said printer device, opposite said first side.

18. A method as claimed in claim 10 wherein said printer device has opposite sides and wherein each of said first and second print formats comprises a plurality of print columns, and, when read from left to right, has a left-most column and a right-most column, comprising the steps of:

providing a control unit which generates said print control signals and entering an address into said control unit;

supplying an envelope with a top edge, as said print medium, on which the address is to be printed, as said imprint to a left of said opposite sides of said printer device on edge with said top edge up;

conducting said first printing pass of said envelope past said print head while supplying print control signals representing said address as said first print format to said print head;

printing said address as said first format on said envelope column-by-column starting with said left-most column of said first print format, and ending with said right-most column of said first print format;

in said turning station, rotating said envelope by 180° in said plane containing the flat sides of said envelope;

supplying said envelope into said printer device at a right of said opposite sides of said printer device;

conducting said second printing pass of said envelope past said print head and printing a franking imprint as said second print format column-by-column on said envelope starting said right-most column of said second print format and ending with said left-most column of said second print format; and removing said envelope with said address as said first print format and said franking imprint as said second print format thereon from said left side of said printer device.

19. A method as claimed in claim 10 wherein said printer device has opposite sides and wherein each of said first and second print formats comprises a plurality of print columns, and, when read from left to right, has a left-most column and a right-most column, comprising the steps of:

providing a control unit which generates said print control signals and entering an address into said control unit;

supplying an envelope with a top edge, as said print medium, on which the address is to be printed, as said imprint, to a left of said opposite sides of said printer device on edge with said top edge up;

conducting said first printing pass of said envelope past said print head while supplying print control signals representing said address as said first print format to said print head;

printing said address as said first format on said envelope column-by-column starting with said left-most column of said first print format and ending with said right-most column of said first print format;

in said turning station, rotating said envelope by 180° in said plane containing the flat sides of said envelope;

supplying said envelope to said printer device at said second side of said printer device;

conducting an auxiliary pass of said envelope past said print head without printing on said envelope to return said envelope to said left side of said printer device;

conducting said second printing pass of said envelope past said print head and printing a franking imprint as said second print format column-by-column on said envelope starting with said right-most column of said second print format and ending with said left-most column of said second print format; and removing said envelope with said address as said first print format and said franking imprint as said second print format thereon from at a right of said opposite sides of said printer device.

20. A method as claimed in claim 10 wherein said printer device has opposite sides and wherein each of said first and second print formats comprises a plurality of print columns, and, when read from left to right, has a left-most column and a right-most column, comprising the steps of:

providing a control unit which generates said print control signals and entering an address into said control unit;

supplying an envelope with a top edge, as said print medium on which the address is to be printed, as said imprint, to said turning station with said top edge down and rotating said envelope in said turning station by 180° in the plane containing the flat sides of said envelope;

supplying the envelope from said turning station, on edge with said top edge up, to a left of said opposite sides of said printer device;

conducting said first printing pass of said envelope past said print head while supplying print control signals representing said address as said first print format to said print head;

printing said address as said first format on said envelope column-by-column starting with said left-most column of said first print format and ending with said right-most column of said first print format;

conducting an auxiliary pass of said envelope past said print head without printing on said envelope to return said envelope to said left side of said printer device;

in said turning station, rotating said envelope by 180° in said plane containing the flat sides of said printing medium;

supplying said envelope to said printer device at said left side of said printer device, with said top edge down;

conducting said second printing pass of said envelope past said print head and printing a franking imprint as said second print format column-by-column on said envelope starting with said right-most column of said second print format and ending with said left-most column of said second print format; and removing said envelope with said address as said first print format and said franking imprint as said second print format thereon from a right of said opposite sides of said printer device.

21. A method as claimed in claim 10 wherein aid printer device has opposite sides and wherein each of said first and second print formats comprises a plurality of print columns, and, when read from left to right, has a left-most column and a right-most column, comprising the steps of:

providing a control unit which generates said print control signals and entering an address into said control unit;

supplying an envelope with a top edge and a bottom edge, as said print medium, on which the address is to be printed, as said imprint, with said bottom edge up to a left of said opposite sides of said printer device;

conducting said first printing pass of said envelope past said print head while supplying print control signals representing a franking imprint as said first print format to said print head;

printing said franking imprint as said first format on said envelope column-by-column starting with said right-most column of said first print format, and ending with said left-most column of said first print format;

in said turning station, rotating said envelope by 180° in plane containing the flat sides of said envelope;

supplying said envelope to said printer device at a right of said opposite sides of said printer device with said top edge up;

conducting said second printing pass of said envelope past said print head and printing said address as said second print format column-by-column on said envelope starting with said right-most column of said second print format and ending with said left-most column of said second print format; and removing said envelope with said franking imprint as said first print format and said address as said second print format thereon from said left side of said printer device.

22. A method as claimed in claim 10 comprising the steps of:

providing a control unit which generates said print control signals and entering an address into said control unit;

supplying an envelope with a bottom edge, as said print medium, on which the address is to be printed, as said imprint, with said bottom edge up to a left of said opposite sides of said printer device;

conducting said first printing pass of said envelope past said print head while supplying print control signals representing a franking imprint as said first print format to said print head;

printing said franking imprint as said first format on said envelope column-by-column starting with said right-most column of said first print format and ending with said left-most column of said first print format;

supplying said envelope from a right of said opposite sides of said printer device to said turning station;

in said turning station, rotating said print medium by 180° in said plane containing the flat sides of said printing medium;

supplying said envelope to said printer device from said turning station at said left side of said printer device;

conducting said second printing pass of said envelope past said print head and printing said address as said second print format column-by-column on said envelope starting with said left-most column of said second print format and ending with said right-most column of said second print format; and removing said envelope with said franking imprint as said first print format and said address as said second print format thereon from said right side of said printer device.

23. A method as claimed in claim 10 wherein said printer device has a control unit which generates said print control signals, wherein said first print format has a data content, and comprising the additional steps of storing a plurality of different data contents for said first print format in a data bank, and accessing said data bank by said control unit to obtain a data content for said first print format for said imprint having said first print format on said print medium.

* * * * *